(12) United States Patent
Hunt

(10) Patent No.: US 8,729,456 B2
(45) Date of Patent: *May 20, 2014

(54) FREQUENCY SELECTIVE ELECTROMAGNETIC DETECTOR

(75) Inventor: Jeffrey H. Hunt, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 347 days.

This patent is subject to a terminal disclaimer.

(21) Appl. No.: 13/019,853

(22) Filed: Feb. 2, 2011

(65) Prior Publication Data

US 2012/0193521 A1 Aug. 2, 2012

(51) Int. Cl.
*G01J 5/20* (2006.01)
*B82Y 99/00* (2011.01)

(52) U.S. Cl.
USPC .................................................. 250/227.23

(58) Field of Classification Search
USPC ............ 250/227.23, 339.04; 330/69; 977/954
See application file for complete search history.

(56) References Cited

U.S. PATENT DOCUMENTS

| 6,891,660 B2 | 5/2005 | Hunt et al. |
| 6,924,925 B2 | 8/2005 | Hunt et al. |
| 2009/0072145 A1* | 3/2009 | Peczalski et al. ........ 250/339.04 |
| 2012/0062317 A1* | 3/2012 | Huber ............................ 330/69 |

OTHER PUBLICATIONS

C.A. Huber et al., Nanowire Array Composites, Science 263, pp. 800-802 (1994).
T.E. Huber et al., Confinement Effects and Surface Charge in Bi Nanowires, Appl. Phys. Lett. 84, pp. 1326-1328 (2004).
P. Jones et al., Electrical contact resistance of individual bismuth telluride nanowires, Proc. 25th Int. Conf. Thermoelectrics held 2006 (IEEE, Piscattaway, 2007). pp. 693-696.

* cited by examiner

*Primary Examiner* — Seung C Sohn
(74) *Attorney, Agent, or Firm* — Vista IP Law Group LLP; Cynthia A. Dixon

(57) ABSTRACT

An apparatus, system, and method are disclosed for a frequency selective electromagnetic detector. In particular, the frequency selective electromagnetic detector includes a nanowire array constructed from a plurality of nanowires of different compositions. At least one nanoparticle-sized diameter thermoelectric junction is formed between the nanowires of different compositions. When a nanoparticle-sized diameter thermoelectric junction senses a photon, the nanoparticle-sized diameter thermoelectric junction emits an electrical pulse voltage that is proportional to an energy level of the sensed photon. In one or more embodiments, the frequency selective electromagnetic detector is a frequency selective optical detector that is used to sense photons having optical frequencies. In at least one embodiment, at least one of the nanowires in the nanowire array is manufactured from a compound material including Bismuth (Bi) and Tellurium (Te).

9 Claims, 2 Drawing Sheets

FREQUENCY SELECTIVE ELECTROMAGNETIC DETECTOR

BACKGROUND

The present disclosure relates to electromagnetic detectors. In particular, it relates to frequency selective electromagnetic detectors.

SUMMARY

The present disclosure relates to an apparatus, system, and method for a frequency selective electromagnetic detector. In one or more embodiments, the disclosed frequency selective electromagnetic detector includes a nanowire array constructed from a plurality of nanowires of different compositions. A nanowire has a diameter in a size range associated with nanoparticles, which are 1-100 nanometers (nm) in size. The length of a nanowire is longer than the diameter of the nanowire, and the length of a nanowire can be in a size range from millimeters (mm) to centimeters (cm). In the nanowire array, at least one nanoparticle-sized diameter thermoelectric junction is formed between the nanowires of different compositions. During operation of the detector, when at least one nanoparticle-sized diameter thermoelectric junction senses at least one photon, the nanoparticle-sized diameter thermoelectric junction(s) emits at least one electrical pulse voltage that is proportional to the energy level of the photon(s) that is sensed.

In one or more embodiments, at least one of the nanowires in the nanowire array is manufactured from a compound material including Bismuth (Bi) and Tellurium (Te). In at least one embodiment, the detector is a frequency selective optical detector that is used to sense photons having optical frequencies. In some embodiments, the material of at least one of the nanowires is selected according to the frequency of the photons that are desired to be sensed. In one or more embodiments, the diameter of at least one nanoparticle-sized diameter thermoelectric junction is selected according to the frequency of the photons that are desired to be sensed.

In at least one embodiment, a thermoelectric frequency selective system for sensing photons includes at least one intensity control device, at least one polarization control device, at least one focusing element, at least one frequency selective electromagnetic detector, and at least one processor. The intensity control device(s) is configured for selecting a range of the rate of arrival of the photons that are desired to be sensed. In addition, the polarization control device(s) is configured for selecting the polarization of the photons that are desired to be sensed. Also, the focusing element(s) is configured for focusing the photons that are being sensed. Additionally, the frequency selective electromagnetic detector(s) is configured to detect the photons that are focused from the focusing element(s). It should be noted that when the frequency selective electromagnetic detector(s) senses a photon(s), the frequency selective electromagnetic detector(s) is configured to emit an electrical pulse voltage(s) that is proportional to an energy level of the photon(s) that is sensed. In addition, the processor(s) is configured for processing the emitted electrical pulse voltage(s).

In one or more embodiments, at least one intensity control device is an electromagnetic energy filtering device. In at least one embodiment, at least one polarization control device is a polarizer, which is configured to select horizontal polarization, vertical polarization, left-hand circular polarization, and/or right-hand circular polarization. In some embodiments, at least one focusing element is a signal collection lens.

In one or more embodiments, a method using a thermoelectric frequency selective system for sensing photons involves propagating at least one photon into the input of at least one intensity control device. The method further involves selecting, with the intensity control device(s), a range of the rate of arrival of the photon(s) that is desired to be sensed. Also, the method further involves propagating the photon(s) from the output of the intensity control device(s) into the input of at least one polarization control device. In addition, the method further involves selecting, with the polarization control device(s), a polarization the photon(s) that is desired to be sensed.

Additionally, the method further involves propagating the photon(s) from the output of the polarization control device(s) onto the collection surface of at least one focusing element. Also, the method involves focusing, with the focusing element(s), the photon(s) that is being collected onto at least one frequency selective electromagnetic detector. In addition, the method involves detecting, with the frequency selective electromagnetic detector(s), the photon(s) that was focused by the focusing element(s). Further, the method involves emitting, from an output of the frequency selective electromagnetic detector(s), at least one electrical pulse voltage that is proportional to an energy level of the photon(s). In addition, the method further involves processing, with at least one processor, the electrical pulse voltage(s).

DRAWINGS

These and other features, aspects, and advantages of the present disclosure will become better understood with regard to the following description, appended claims, and accompanying drawings where:

Figure 3:
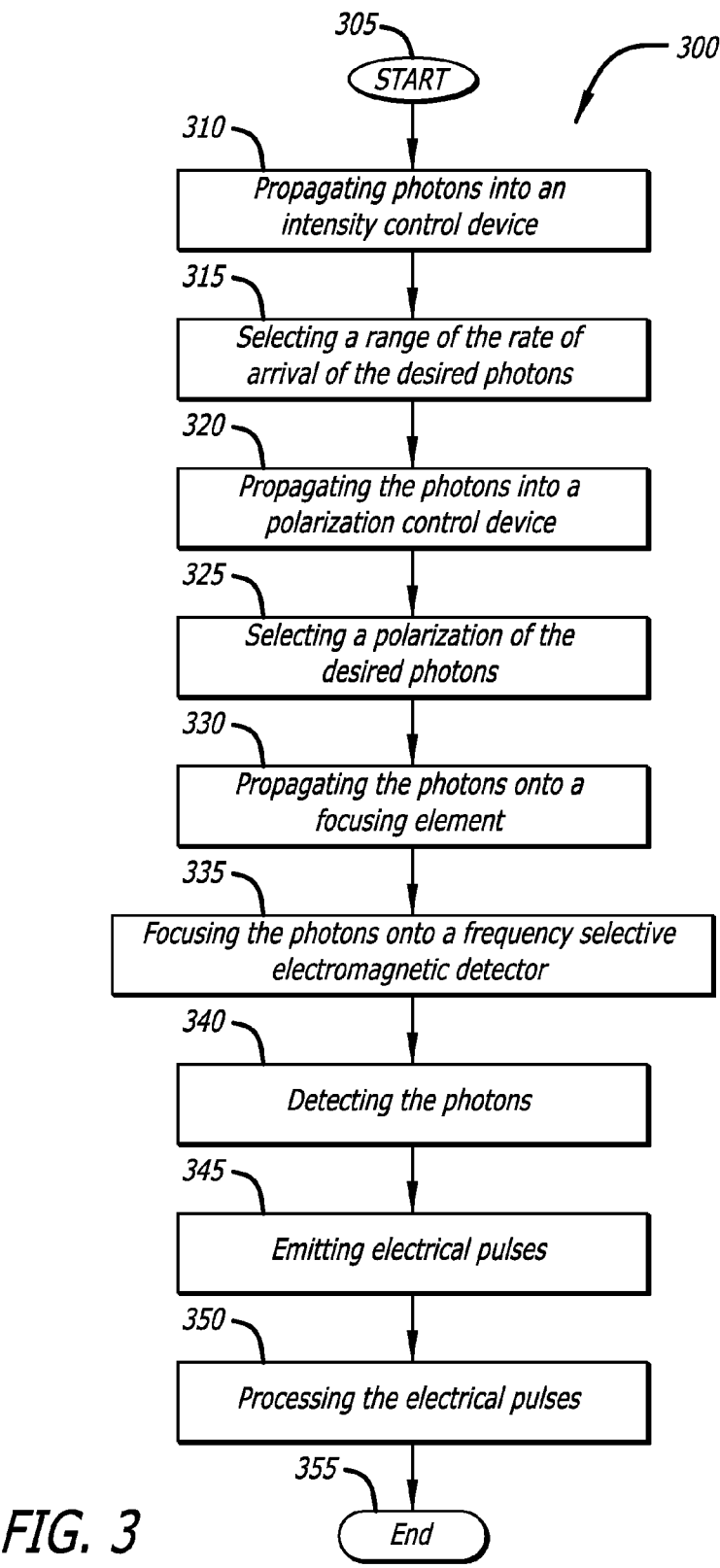

FIG. 3 displays a flow chart of the disclosed method for using the disclosed thermoelectric frequency selective system for sensing photons, in accordance with at least one embodiment of the present disclosure.

DESCRIPTION

The methods and apparatus disclosed herein provide an operative system for electromagnetic detectors. Specifically, this system relates to frequency selective electromagnetic detectors. In particular, the present disclosure employs nanowires to build a frequency selective electromagnetic detector. For the detector, the nanowires are constructed in a nanowire array. The nanowire array allows for the detector to be able to convert the detected electromagnetic signals into electrical signals, while maintaining the wavelength (i.e. frequency) information associated with the detected electromagnetic signals.

The disclosed frequency selective electromagnetic detector is preferably a frequency selective optical detector for sensing photons having optical frequencies. However, in alternative embodiments, the disclosed frequency selective electromagnetic detector may be manufactured to detect frequencies of electromagnetic radiation other than optical frequencies. In addition, the nanowires are preferably manufactured from a compound material containing Bismuth (Bi) and Tellurium (Te) (e.g., Bismuth Telluride ($Bi_2Te_3$)). However, in other embodiments of the present disclosure, the nanowires may be manufactured from other materials that exhibit thermoelectric properties that are similar to the thermoelectric properties of Bismuth Telluride.

In order to better understand the features of the disclosed frequency selective electromagnetic detector, a brief discussion regarding conventional optical detectors is presented. Conventional optical detectors typically operate as bulk frequency absorption devices. In fact, most conventional optical detectors employ bulk semiconductors, which absorb electromagnetic radiation across large frequency ranges and have no means to discriminate against electromagnetic radiation in specific frequency ranges. In order to make these optical detectors be wavelength selective, optical elements (e.g., filters, diffraction gratings, etc.) must be placed in the optical path in front of the optical detector to only allow the electromagnetic radiation of interest to reach the detector. The inclusion of these optical elements introduces a disadvantage to these optical detector systems because they add additional size, weight, and complexity to the optical detector systems. In addition, it should be noted that some conventional optical detectors require their optical elements to be in strict alignment with the optical path in order to make them operational. As such, considerable effort is required to simply make these optical detector systems operational.

Quantum sensing of light that can detect single-photons while maintaining wavelength sensitivity is very challenging to achieve. However, a detector employing nanoparticle-sized diameter thermoelectric junctions can achieve this type of quantum sensing. When a thermoelectric element is exposed to light, the electromagnetic field is dissipated in the element, and the energy that is deposited generates electrical power that can be used for sensing the light. This type of thermoelectric element is generally referred to as a bolometer. Generally, a bolometer is a device for measuring the energy of incident electromagnetic radiation.

It is possible to fabricate nanoparticle-sized bolometers from nanoparticle-sized diameter junctions between nanowires of different compositions. These nanoparticle-sized diameter junctions respond to individual photons by emitting an individual electrical pulse having a voltage that is proportional to the temperature change caused by the absorption of the photon. The temperature change is proportional to the energy of the photon. Thus, these nanoparticle-sized diameter junctions are sensitive to wavelength. It should be noted that recently, it has been demonstrated that as the wire diameter of a nanoware is reduced, thermal transport in the nanowire is drastically decreased because of less phonon scattering within the nanowire walls.

Currently, the detectors that operate in the single photon regime are limited to photomultipliers and avalanche photo-diodes (APD). Neither of these types of devices has wavelength selectivity. Photomultipliers are constructed from tubes that are very delicate and, thus, they can easily be damaged. Avalanche photodiodes must operate in Geiger mode for them to achieve single photon detection. As such, avalanche photodiodes are extremely noisy, and have long dead times after they detect a photon. The frequency selective electromagnetic detector of the present disclosure will not only solve the problems associated with each of these two types of detectors, but will also allow for wavelength selectivity.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
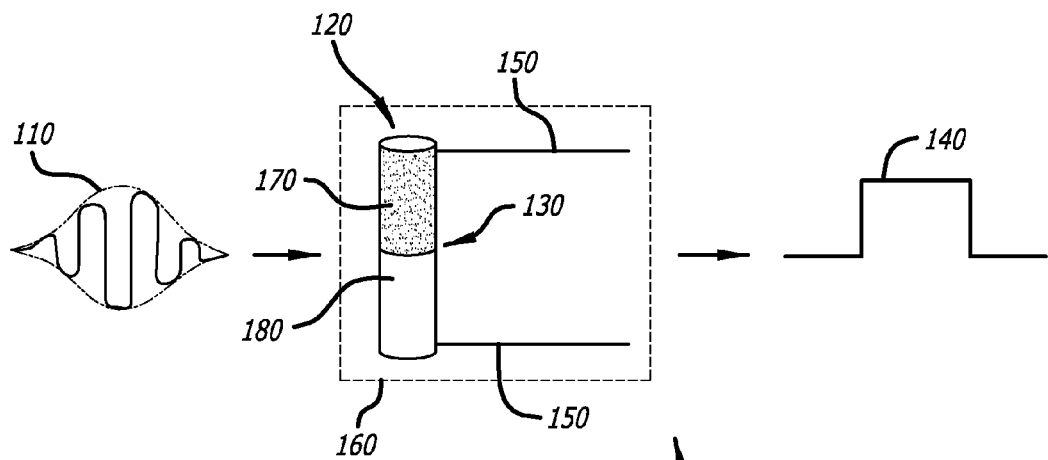
FIG. 1 illustrates a simplified block diagram of the disclosed frequency selective electromagnetic detector during operation, in accordance with at least one embodiment of the present disclosure.

FIG. 1 shows a simplified block diagram of the disclosed frequency selective electromagnetic detector during operation 100, in accordance with at least one embodiment of the present disclosure. In this figure, a photon 110 is shown to be propagated towards the frequency selective electromagnetic detector 160. The photon has a frequency (v), which is proportional to its level of energy (E). Energy (E) is equal to hv, where h is equal to the Planck constant. It should be noted that for a given frequency (v), its corresponding wavelength (λ) is equal to c/v, where c is equal to the speed of light.

Also in this figure, the frequency selective electromagnetic detector 160 is shown to include a composite nanowire 120, which is fabricated from two different materials 170, 180. Two electrical terminals 150 are shown to be connected to each end of the nanowire 120. The nanowire 120 has a nanoparticle-sized diameter thermoelectric junction 130 that is formed between the two different materials 170, 180. During operation of the disclosed frequency selective electromagnetic detector 160, when the nanoparticle-sized diameter thermoelectric junction 130 senses a photon 110, the nanoparticle-sized diameter thermoelectric junction 130 emits an electrical pulse 140 via the electrical terminals 150. The voltage of the emitted electrical pulse 140 is proportional to the photon's 110 level of energy and, thus, the magnitude of the emitted electrical pulse 140 can be used to determine the photon's 110 associated frequency.

With regard to the nanoparticle-sized diameter thermoelectric junction 130, the thermoelectric effect is the effect in the nanoparticle-sized diameter thermoelectric junction 130 where a temperature difference causes a voltage to be generated. Typically, values are measured in microvolts (μV) per Kelvin (K). When a temperature difference is applied to the nanoparticle-sized diameter thermoelectric junction 130, the charged carriers in the nanowire 120, whether they are electrons or holes, diffuse from the nanoparticle-sized diameter thermoelectric junction 130 to the connecting electrical terminals 150. In this way, the behavior is similar to the way that a classical gas expands when heated. As a result, the mobile charged carriers migrating to the electrical terminals 150 leave behind their oppositely charged and immobile nuclei at the nanoparticle-sized diameter thermoelectric junction 130, thus giving rise to a thermoelectric voltage. As such, the nanoparticle-sized diameter thermoelectric junction 130 is in essence operating as a thermoelectric semiconductor.

As previously mentioned, the frequency selective electromagnetic detector 160 is preferably manufactured from a compound material containing Bismuth (Bi) and Tellurium (Te), such as Bismuth Telluride ($Bi_2Te_3$). However, the frequency selective electromagnetic detector 160 may be manufactured from other materials that exhibit thermoelectric properties that are similar to the thermoelectric properties of Bismuth Telluride. In general, the materials to be used are selected according to the desired operational frequency range of the frequency selective electromagnetic detector 160. In addition, it should be noted that the diameter of the nanoparticle-sized diameter thermoelectric junction 130 will also generally be selected according to the desired operational frequency range.

It should be noted that the operational frequency detection regime of any material operating as a conventional semiconductor is limited to shorter wavelengths because photons having longer wavelengths do not have enough energy to excite the electrons across the material band gap. When wavelengths have photon energy that is below that of the material band gap, the semiconductor material will not respond. Operating as a thermoelectric semiconductor, Bismuth Telluride (BiTe) has a very small band gap. Depending upon the exact composition of the BiTe material, the band gap will be approximately 30-50 milli electron volts (meV). Thus, the implication is that the disclosed frequency selective electromagnetic detector 160, when manufactured from BiTe, will operate as a frequency selective optical detector from the soft ultraviolet (UV) spectrum (~300 nanometers (nm)) throughout the visible light spectrum (~400 to 770 nm) well into the infrared spectrum (~770 nm to 20 microns).

Figure 2:
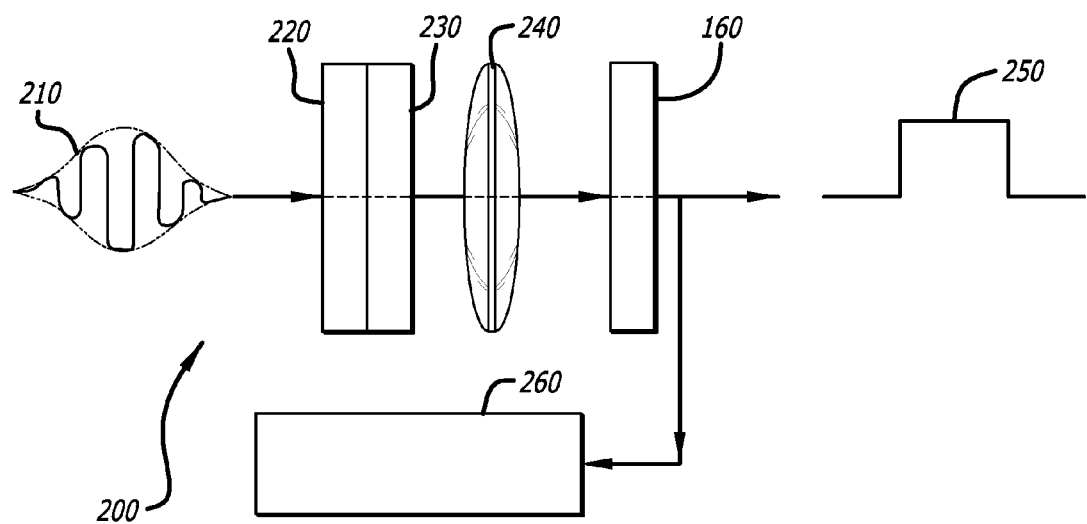
FIG. 2 shows a simplified block diagram of the disclosed thermoelectric frequency selective system for sensing photons, in accordance with at least one embodiment of the present disclosure.

FIG. 2 shows a simplified block diagram of the disclosed thermoelectric frequency selective system for sensing photons 200, in accordance with at least one embodiment of the present disclosure. In order to understand the operation of the disclosed system 200, the path of a single photon 210 travelling through the system 200 is described. In this figure, the photon 210 is shown to be propagated into an intensity control device 220. The intensity control device 220 is used to set a range of operation for the disclosed system 200 (i.e. to select a range of the rate of arrival of the photons that are desired to be sensed) and, thus, it operates as an electromagnetic energy filtering device. In one or more embodiments, types of devices that may be employed for the disclosed intensity control device 220 include, but are not limited to, a neutral-density filter and a dark color filter.

The photon 210 is outputted from the intensity control device 220 and is propagated into a polarization control device 230. The polarization control device 230 is utilized for selecting a polarization of the photons that are desired to be sensed and, as such, it operates as a polarizer. In one or more embodiments, the polarization control device 230 may select various different polarizations including, but not limited to, horizontal polarization, vertical polarization, left-hand circular polarization, and right-hand circular polarization. Types of devices that may be used for the disclosed polarization control device 230 include, but are not limited to, a polarization plate, a Brewster's angle polarizer, and a thin film polarizer. The precise type of polarizer device to be selected for the system 200 depends upon the particular engineering requirements, such as the polarization rejection ratio, the size and weight limitations of the polarizer, and the wavelength range of operation.

From the output of the polarization control device 230, the photon 210 is propagated onto the collection surface of a focusing element 240. In one or more embodiments, types of devices to be employed for the focusing element 240 include, but are not limited to, a single lens, a double lens, a Fresnel lens, refractive elements, reflective elements (e.g., concave mirrors), and other related lens systems up to the complexity of a fully engineered telescope. The focusing element 240 is used to focus the photon 210 onto a frequency selective electromagnetic detector 160.

Once the frequency selective electromagnetic detector 160 senses the photon 210, the frequency selective electromagnetic detector 160 emits an electrical pulse 250 that has a voltage that is proportional to the photon's 210 energy level. The electrical pulse 250 is then inputted into a processor 260 for processing. The processor 260 then uses the emitted electrical pulse 250 information to determine the photon's 110 associated frequency and/or wavelength.

For the disclosed system 200, a procedure is necessary to provide for frequency calibration. Typically, this involves using emission spectra from samples (e.g., neon and mercury) that have frequency outputs that are well characterized and traceable to a standard calibration, such as the National Institute of Standards and Technology (NIST) standards. With these outputs propagated through the frequency selective electromagnetic detector 160 and operationally correlated to the known standards, the overall system 200 will be frequency calibrated.

In addition, a procedure is necessary to provide for temporal calibration for the system 200. Generally, this involves using timing pulses at one or more frequencies that have pulse spacing that is well defined. Usually, high precision devices will be tied to absolute standards generated by NIST or some other carefully calibrated sources. With these outputs propagated though the frequency selective electromagnetic detector 160 and operationally correlated to the known standards, the overall system 200 will be temporally calibrated.

FIG. 3 shows a flow chart 300 of the disclosed method for using the disclosed thermoelectric frequency selective system for sensing photons, in accordance with at least one embodiment of the present disclosure. It should be noted that, in one or more embodiments of the present disclosure, the steps as shown in the flow chart 300 may be performed in a variety of different orders than as depicted in the figure. In addition, it should be noted that in some embodiments, at least one of the steps as shown in the flow chart 300 may be omitted from the method.

At the start 305 of the disclosed method, photons are propagated into an intensity control device 310. Then, a range of the rate of arrival of the desired photons is selected 315. The photons are then propagated into a polarization control device 320. A selection of the polarization of the desired photons 325 is performed. Then, the photons are propagated onto a focusing element 330. The photons are then focused onto a frequency selective electromagnetic detector 335. After the photons are focused onto the detector, the photons are detected 340. Once the photons are detected, electrical pulses, which have voltages that are proportional to each of the individual photon's 210 energy level, are emitted 345. Then, the emitted electrical pulses are processed 350 in order to determine each of the photon's associated frequency and/or wavelength. After the electrical pulses are processed, the method ends 355.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

I claim:

1. A frequency selective electromagnetic detector, the detector comprising:
    a nanowire array constructed from a plurality of nanowires of different compositions,
    wherein at least one nanoparticle-sized diameter thermoelectric junction is formed between the nanowires of different compositions,
    wherein when the at least one nanoparticle-sized diameter thermoelectric junction senses at least one photon, the at least one nanoparticle-sized diameter thermoelectric junction emits at least one electrical pulse voltage that is proportional to an energy level related to a wavelength of the at least one photon.

2. The detector of claim 1, wherein at least one of the nanowires in the nanowire array is manufactured from a compound material including Bismuth (Bi) and Tellurium (Te).

3. The detector of claim 1, wherein the detector is a frequency selective optical detector that is used to sense photons having optical frequencies.

4. The detector of claim 1, wherein a material of at least one of the plurality of nanowires is selected according to a frequency of the at least one photon that is to be sensed.

5. The detector of claim 1, wherein a diameter of the at least one nanoparticle-sized diameter thermoelectric junction is selected according to a frequency of the at least one photon that is to be sensed.

6. The detector of claim 2, wherein the compound material is Bismuth Telluride ($Bi_2Te_3$).

7. The detector of claim 1, wherein at least one of the nanowires in the nanowire array is manufactured from at least one material that exhibits thermoelectric properties that are similar to thermoelectric properties of Bismuth Telluride ($Bi_2Te_3$).

8. The detector of claim 1, wherein at least one of the nanowires in the nanowire array has a length that is longer than its diameter.

9. The detector of claim 1, wherein at least one of the nanowires in the nanowire array has a diameter in a size range associated with nanoparticles, wherein the nanoparticles are each 1-100 nanometers (nm) in size

* * * * *